E. A. OLIVER.
AUTOMOBILE FIFTH WHEEL.
APPLICATION FILED MAY 18, 1908.
928,790.
Patented July 20, 1909.
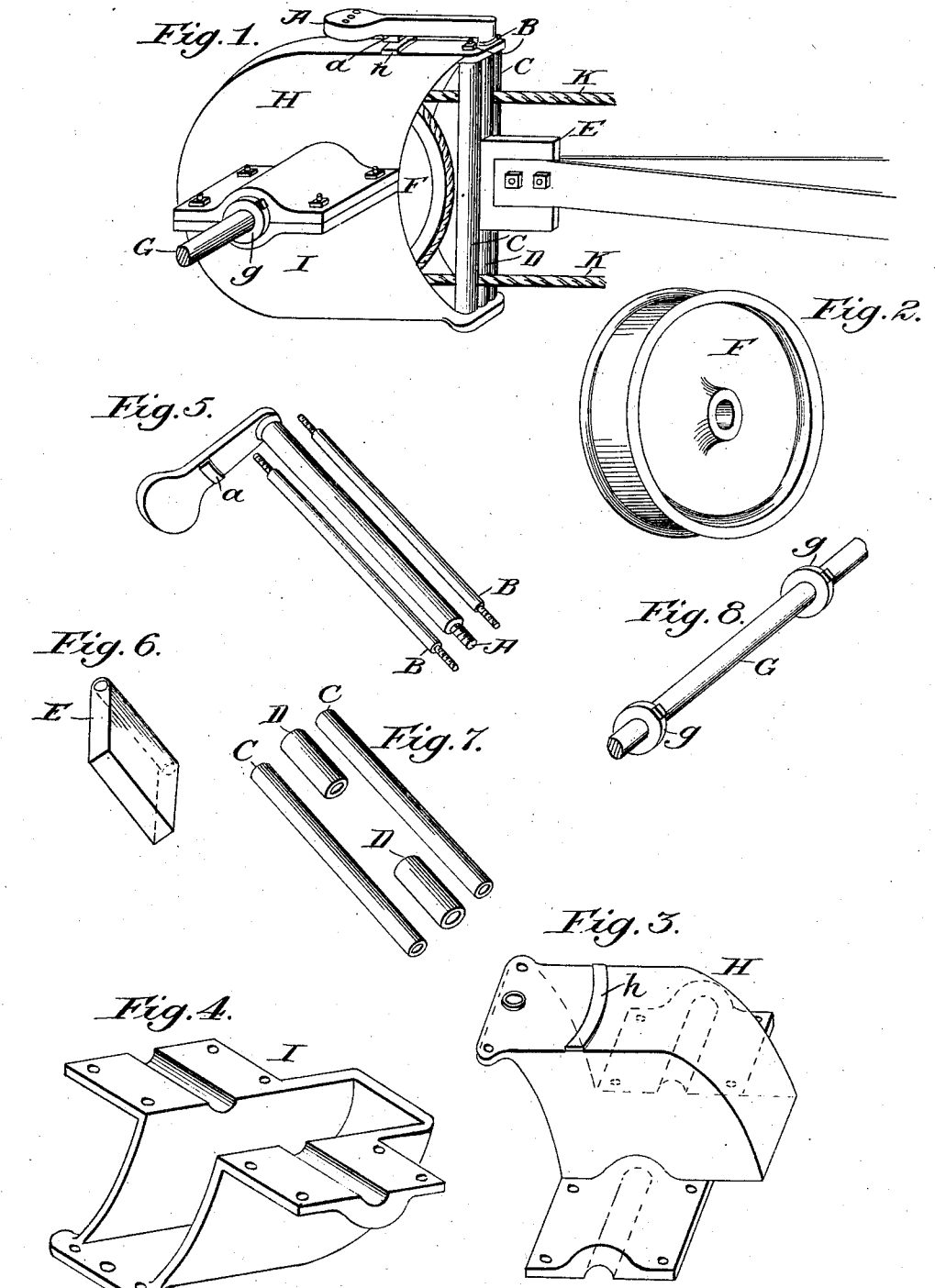

UNITED STATES PATENT OFFICE.

EVERTT A. OLIVER, OF RICHLAND, MISSOURI.

AUTOMOBILE FIFTH-WHEEL.

No. 928,790.   Specification of Letters Patent.   Patented July 20, 1909.

Application filed May 18, 1908. Serial No. 433,487.

*To all whom it may concern:*

Be it known that I, EVERTT A. OLIVER, a citizen of the United States, residing at Richland, in the county of Pulaski, in the State of Missouri, have invented a new and useful Automobile Fifth-Wheel, of which the following is a specification.

My invention relates to improvements in automobile fifth-wheels in which two perpendicular bolts with antifriction rollers and a king-pin with antifriction rollers secured in a housing are adapted to guide a cable onto a grooved wheel secured to the front axle: and the objects of my invention are first, to provide a means by which a cable running from a wheel on the hind axle will be guided onto a wheel on the front axle: second, to reduce the friction of the cable on the guides: third, to provide a means by which the front end of the body or springs of the automobile will rest directly over the front axle. I attain these objects by the mechanism illustrated in the accompanying drawing, in which—

Figure 1 is a perspective view showing one embodiment of my invention. Fig. 2 is a perspective view of the grooved wheel. Fig. 3 is a perspective view of the upper half of the housing. Fig. 4 is a perspective view of the lower half of the housing. Fig. 5 is a perspective view of the king pin and guide bolts. Fig. 6 is a perspective view of the head piece to which the reaches are secured. Fig. 7 is a perspective view of the anti-friction rollers, and Fig. 8 is a perspective view of the axle.

Similar letters refer to similar parts throughout the several views.

The king-pin A, has a horizontal arm widened at the front end with holes for the purpose of securing the front end of the body or spring of the automobile to the fifth-wheel which horizontal arm reaches to above the center of the front axle. The horizontal arm of the king-pin A, has a friction surface *a*, which rests on friction surface *h*. The perpendicular portion of king-pin A, passes through the rear edge of housing H, antifriction roller D, head piece E, another antifriction roller D, and through rear edge of housing I, where it is secured by a nut. The bolts B B, hold in position antifriction rollers C C, and said bolts B B, have a shoulder at each end that fits snugly against the under side of housing H, and the upper side of housing I. and are secured at each end by a nut. The antifriction rollers C C, and D D, are adapted to guide the cable K K, onto the wheel F. This cable is a driving cable which passes around a wheel secured to the rear axle (not shown) and extends from the latter to the wheel F on the front axle. The cable K K, passes on one side of antifriction rollers D D, when going on and toward wheel F, and passes twice around wheel F, and when going off and from wheel F, passes on the opposite side at opposite end of antifriction rollers D D, which equalizes the friction of the cable between friction rollers C C, and D D. The axle G, wheel F, cable K K, reaches J J, and bands with set screws *g g*, are no part of my invention and are shown and referred to for completeness.

I claim:—

1. In a running gear for vehicles, the combination with a driving cable, of an axle, a grooved wheel secured to said axle and arranged to be driven by said cable, a housing for said wheel, a king pin journaled in said housing, and guide members carried by said housing and arranged to coöperate with said king pin for guiding said driving cable onto and off from said wheel.

2. In a running gear for vehicles, the combination with a driving cable, of an axle, a grooved wheel secured to said axle and arranged to be driven by said cable, a housing for said wheel, a king pin carried by said housing and having a laterally extending arm provided with an expanded head, a guide member carried by said housing on each side of said king pin and coöperating with the latter to guide said driving cable onto and off from said wheel.

3. In a running gear for vehicles, the combination with a driving cable, of an axle, a grooved wheel secured to said axle and arranged to be driven by said cable, a housing for said wheel, a king pin carried by said housing and having its axis disposed in the plane of said wheel and being provided with a laterally extending integral arm arranged to be attached to the body of the vehicle, a guide member carried by said housing on each side of said king pin, and arranged to coöperate with the latter to guide said cable onto and off from said wheel, and rollers arranged exteriorly of said guide members and said king pin for lessening the friction of said guiding means.

4. In a running gear for vehicles, the combination with a driving cable, of an axle, a grooved wheel secured to said axle and arranged to be driven by said cable, a housing for said wheel, a king pin carried by said housing and having its axis disposed in the plane of said wheel and being provided with a laterally extending integral arm arranged to be attached to the body of the vehicle, a head piece secured to said king pin centrally of said housing, a guide member carried by said housing on each side of said king pin, rollers arranged exteriorly of said guide members, a roller arranged exteriorly of said king pin below said head, and a roller arranged upon said king pin above said head, said king pin rollers arranged to coöperate with the rollers of said guide members for guiding said cable onto and off from said wheel.

EVERTT A. OLIVER.

Witnesses:
S. L. GIBSON,
A. E. OLIVER.